(12) United States Patent
Mui et al.

(10) Patent No.: US 9,164,584 B2
(45) Date of Patent: Oct. 20, 2015

(54) METHODS AND DEVICES FOR CONSISTENCY OF THE HAPTIC RESPONSE ACROSS A TOUCH SENSITIVE DEVICE

(75) Inventors: Gary K. Mui, Arlington Heights, IL (US); Siddharth Sinha, Schaumburg, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 619 days.

(21) Appl. No.: 12/427,197

(22) Filed: Apr. 21, 2009

(65) Prior Publication Data

US 2010/0265191 A1    Oct. 21, 2010

(51) Int. Cl.
| | |
|---|---|
| *G06F 3/041* | (2006.01) |
| *G06F 3/01* | (2006.01) |
| *G06F 3/0488* | (2013.01) |

(52) U.S. Cl.
CPC ............ *G06F 3/016* (2013.01); *G06F 3/04886* (2013.01); *G06F 2203/014* (2013.01); *G06F 2203/04809* (2013.01)

(58) Field of Classification Search
CPC ................ G06F 3/016; G06F 3/04886; G06F 2203/04809; G06F 2203/014
USPC .................................................. 345/156–173
See application file for complete search history.

(56) References Cited

U.S. PATENT DOCUMENTS

| | | | |
|---|---|---|---|
| 4,136,268 A | 1/1979 | Rose | |
| 4,626,730 A | 12/1986 | Hubbard, Jr. | |
| 4,652,805 A | 3/1987 | Kohn | |
| 4,761,582 A | 8/1988 | McKee | |
| 4,853,580 A | 8/1989 | Sula | |
| 5,887,995 A | 3/1999 | Holehan | |
| 5,945,772 A | 8/1999 | Macnak et al. | |
| 5,982,304 A | 11/1999 | Selker et al. | |
| 5,982,612 A | 11/1999 | Roylance | |
| 5,988,902 A | 11/1999 | Holehan | |
| 6,064,141 A | 5/2000 | Wiciel | |
| 6,078,126 A | 6/2000 | Rollins et al. | |
| 6,118,435 A | 9/2000 | Fujita et al. | |
| 6,259,188 B1 | 7/2001 | Woodard et al. | |

(Continued)

FOREIGN PATENT DOCUMENTS

| | | |
|---|---|---|
| CN | 101350575 A | 1/2009 |
| RU | 2353002 C2 | 4/2009 |
| WO | 2007130771 A2 | 11/2007 |

OTHER PUBLICATIONS

Patent Cooperation Treaty, International Search Report and Written Opinion of the International Searching Authority for International Application No. PCT/US2010/028306, Oct. 20, 2010, 16 pages.

(Continued)

*Primary Examiner* — Amare Mengistu
*Assistant Examiner* — Sarvesh J Nadkarni

(57) ABSTRACT

Disclosed are methods and touch sensitive devices including a haptic actuator drive frequency module stored by the memory and in communication with the controller, the haptic actuator drive frequency module being configured to receive touch input from one of a plurality of regions of the touch sensitive layer and to output one of a plurality of haptic actuator drive frequency signals based upon the region from which the haptic actuator drive frequency module received the touch input to provide for consistency of the haptic response across a touch sensitive device.

19 Claims, 4 Drawing Sheets

(56) References Cited

U.S. PATENT DOCUMENTS

| | | | |
|---|---|---|---|
| 6,359,371 B1 | 3/2002 | Perkins et al. | |
| 6,366,202 B1 | 4/2002 | Rosenthal | |
| 6,366,212 B1 | 4/2002 | Lemp | |
| 6,376,967 B2 | 4/2002 | Saarmaa et al. | |
| 6,409,675 B1 | 6/2002 | Turcott | |
| 6,534,732 B2 | 3/2003 | Karasik et al. | |
| 6,563,254 B2 | 5/2003 | Perkins et al. | |
| 6,707,433 B2 | 3/2004 | Ohtsuka et al. | |
| 6,710,518 B2 | 3/2004 | Morton et al. | |
| 6,822,635 B2 | 11/2004 | Shahoian et al. | |
| 6,995,744 B1 | 2/2006 | Moore et al. | |
| 7,106,305 B2 | 9/2006 | Rosenberg | |
| 7,205,978 B2 | 4/2007 | Poupyrev et al. | |
| 7,663,607 B2 | 2/2010 | Hotelling et al. | |
| 8,120,585 B2 | 2/2012 | Linjama et al. | |
| 8,325,144 B1 * | 12/2012 | Tierling et al. | 345/173 |
| 2005/0134562 A1 | 6/2005 | Grant et al. | |
| 2006/0050059 A1 | 3/2006 | Satoh et al. | |
| 2006/0052143 A9 | 3/2006 | Tuovinen | |
| 2007/0097091 A1 | 5/2007 | Ng et al. | |
| 2008/0062145 A1 * | 3/2008 | Shahoian et al. | 345/173 |
| 2008/0068348 A1 | 3/2008 | Rosenberg et al. | |
| 2008/0068350 A1 * | 3/2008 | Rosenberg et al. | 345/173 |
| 2008/0150905 A1 * | 6/2008 | Grivna et al. | 345/173 |
| 2009/0243997 A1 * | 10/2009 | Tierling et al. | 345/156 |
| 2009/0322496 A1 * | 12/2009 | da Costa | 340/407.2 |
| 2010/0079264 A1 * | 4/2010 | Hoellwarth | 340/407.2 |

OTHER PUBLICATIONS

The State Intellectual Property Office of the People's Republic of China, Notificatio Nof the First Office Action, Date of Issuing: Oct. 23, 2013, all pages.

Notice of Decision to Grant for RU Application No. 2011147013, mailed Aug. 20, 2014, 16 pages.

Office Action for CN Application No. 201080016736.8 (with English Translation), mailed Jul. 7, 2014, 25 pages.

Office Action received for Chinese Patent Application No. 201080016736.8, mailed on Oct. 29, 2014, 3 pages (Official Action Only).

Notice of Decision to Grant for Chinese Patent Application No. 201080016736.8, mailed on Mar. 2, 2015, 4 pages.

Communication Under Rule 164(2)(a) for EP Application No. 10723829.7, mailed Aug. 6, 2015, 4 pages.

* cited by examiner

METHODS AND DEVICES FOR CONSISTENCY OF THE HAPTIC RESPONSE ACROSS A TOUCH SENSITIVE DEVICE

FIELD

Disclosed are methods and touch sensitive devices including a haptic actuator drive frequency module to output one of a plurality of haptic actuator drive frequency signals based upon the region from which the haptic actuator drive frequency module received the touch input to provide for consistency of the haptic response across a touch sensitive device.

BACKGROUND

Touch screens are utilized in many electronic devices, from airport check in screens, to ATMs, and to mobile communication devices. When a user touches the screen, a touch sensor will send a touch signal to a controller so that the controller can carry out a function based on the user input. Haptic response, that is, a response from the touch screen when it is touched, provides a user tactile feedback that the touch screen has received the input.

Haptic response is provided by any type of electromechanical actuator, such as by a piezo electric actuator layered with a touch sensor layer for localized haptics. When the touch signal is sent to the controller, the controller will in turn send a haptic response signal to an actuator which will drive the actuator at a particular frequency and in accordance with a voltage level so that it provides haptic feedback to the user. The user may feel a click nearly instantaneously when the user provides input to the touch screen.

DETAILED DESCRIPTION

Products with touch screen or keypad haptics often provide non-uniform and/or insufficient tactile response. That is, driving one or more actuators of a product at a fixed voltage and frequency results in an uneven response over the touch screen or keypad area. A response can be increased by increasing the drive voltage but energy available is limited. Drive frequency can also affect response, but there is a lack of methodology to determine an optimal frequency. It would be beneficial if a product were tuned so that the haptic response across the touch screen or keypad would be uniform.

Disclosed are methods and touch sensitive devices including a haptic actuator drive frequency module, the haptic actuator drive frequency module being configured to receive touch input from one of a plurality of regions of the touch sensitive layer and to output one of a plurality of haptic actuator drive frequency signals based upon the region from which the haptic actuator drive frequency module received the touch input to provide for consistency of the haptic response across a touch sensitive device.

The instant disclosure is provided to explain in an enabling fashion the best modes of making and using various embodiments in accordance with the present invention. The disclosure is further offered to enhance an understanding and appreciation for the invention principles and advantages thereof, rather than to limit in any manner the invention. While the preferred embodiments of the invention are illustrated and described here, it is clear that the invention is not so limited. Numerous modifications, changes, variations, substitutions, and equivalents will occur to those skilled in the art having the benefit of this disclosure without departing from the spirit and scope of the present invention as defined by the following claims.

It is understood that the use of relational terms, if any, such as first and second, up and down, and the like are used solely to distinguish one from another entity or action without necessarily requiring or implying any actual such relationship or order between such entities or actions.

Much of the inventive functionality and many of the inventive principles are best implemented with or in software programs or instructions and integrated circuits (ICs) such as application specific ICs. In the interest of brevity and minimization of any risk of obscuring the principles and concepts according to the present invention, discussion of such software and ICs, if any, is limited to the essentials with respect to the principles and concepts within the preferred embodiments.

Figure 1:
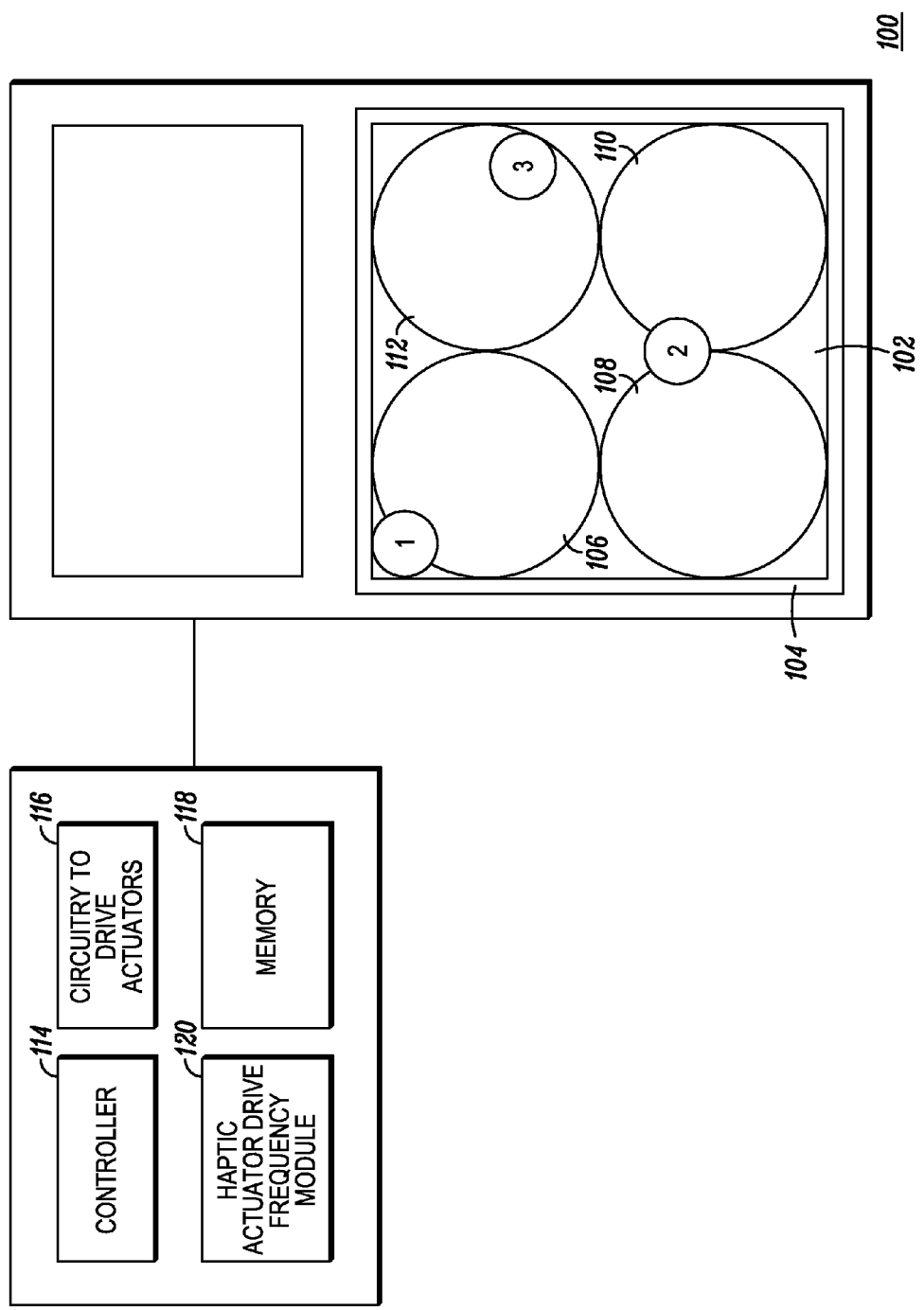
FIG. 1 depicts an embodiment of a touch sensitive device that includes a touch sensitive layer and one or more haptic actuators proximal the touch sensitive layer and communication with the controller.

FIG. 1 depicts an embodiment of a touch sensitive device 102 that includes a touch sensitive layer 104 and one or more haptic actuators 106, 108, 110 and 112 proximal the touch sensitive layer 104 and communication with the controller 114. The touch sensitive device 102, such a resistive or capacitive layer, may be incorporated into any type of electronic device 100, for example a mobile communication device. The one or more haptic actuators 106, 108, 110 and 112 may be in any suitable arrangement and/or configuration, or any type, such as piezoelectric actuators. While depicted as disks, the actuators may be, for example, strips. When the touch sensitive device 102 receives input, the controller 114 will receive the input, and send a signal via the circuitry 116 to drive the actuators 106, 108, 110 and 112, which in turn provide a haptic response to the input.

The resonant frequencies of different areas of a device, in this example, the touch sensitive device 102, may be determined by computational methods or by experiment. By example, different areas 1, 2 and 3 of the touch sensitive device 102 are marked. Each of these different areas 1, 2 and 3 may have different natural frequencies, and therefore, a uniform haptic response across the entire touch sensitive device 102 will feel different to a user, possibly at each different area 1, 2 and 3. Computational methods can be used to extract the natural frequencies. When a structure is excited at its natural frequency, it is at resonance and will have a magnified response. Magnified responses of varying levels at different areas on the touch sensitive device 102 may produce the overall result of a uniform response to the touch of a user. It is understood that an actuator that is not proximal to the area receiving touch input may contribute to the haptic response. A combination of actuators may contribute to the haptic response of a particular area of the touch sensitive device 100.

Values for the resonant frequency of different areas 1, 2 and 3 may be attained to ascertain standardized drive frequencies that may be stored in the memory 118 of the device 100. A haptic actuator drive frequency module 120 can be configured to receive touch input from one of the a plurality of regions, for example, 1, 2 or 3 of the touch sensitive layer 104 and to output one of a plurality of haptic actuator drive frequency signals based upon the region 1, 2 or 3 from which the haptic actuator drive frequency module 120 received the touch input. Circuitry 116 and a surface mapping algorithm of the haptic actuator drive frequency module 120 can drive the individual haptic actuators with different frequencies and/or phases based on which an area of a touch screen is pressed. By firing selective actuators with pulses which may differ in voltage and phase for different areas/zones of the touch sensitive device 102, the response across the device 100 may be perceived by a user as uniform.

One or more modules can carry out certain processes of the methods as described herein. The modules can be implemented in software, such as in the form of one or more sets of prestored instructions, and/or hardware, which can facilitate the operation of the mobile station or electronic device as discussed below. The modules may be installed at the factory or can be installed after distribution by, for example, a downloading operation. The operations in accordance with the modules will be discussed in more detail below.

In accordance with the haptic actuator drive frequency module 120, the appropriate frequency per each key/zone/area is predetermined based on the natural frequency and mode shape of the structure with different areas receiving input. The appropriate modes to excite the different regions of the keypad are selected. Selective actuators (depending on the area pressed) may be fired with appropriately phased pulses.

A device such as device 100 is typically manufactured in an assembly process. While each device manufactured in an assembly process may appear identical, the tolerances of the manufacturing process may make individual devices resonate at slightly different natural frequencies. It would be beneficial to fine tune each device's haptic response individually.

Figure 2:
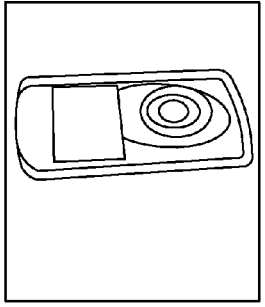
FIG. 2 depicts a chart illustrating differences in computationally derived drive frequency values and experimentally derived individualized drive frequency values for the same device.

FIG. 2 depicts a chart illustrating differences in computationally derived drive frequency values and experimentally derived individualized drive frequency values for the same device 100 (see FIG. 1). The simulation mode shape 230 compared to the experimental mode shape 232 for area 1 number 234, for example, may provide a deviation 236 of −3.66% between the simulation and the experimental values. Areas 2 and 3 in the mode number 234 column also show deviations. For fine tuning, the haptic actuator drive frequency module 120 may receive values experimentally derived when possible. A device may be provided on the assembly line that in a short period of time, and using a tap to different areas of a touch sensitive device, may be able to fine tune the surface mapping algorithm of the haptic actuator drive frequency module 120 to drive the individual haptic actuators with different frequencies and/or phases based on an individualized set of drive frequency values. The fine tuning may provide an optimized haptic response.

Figure 3:
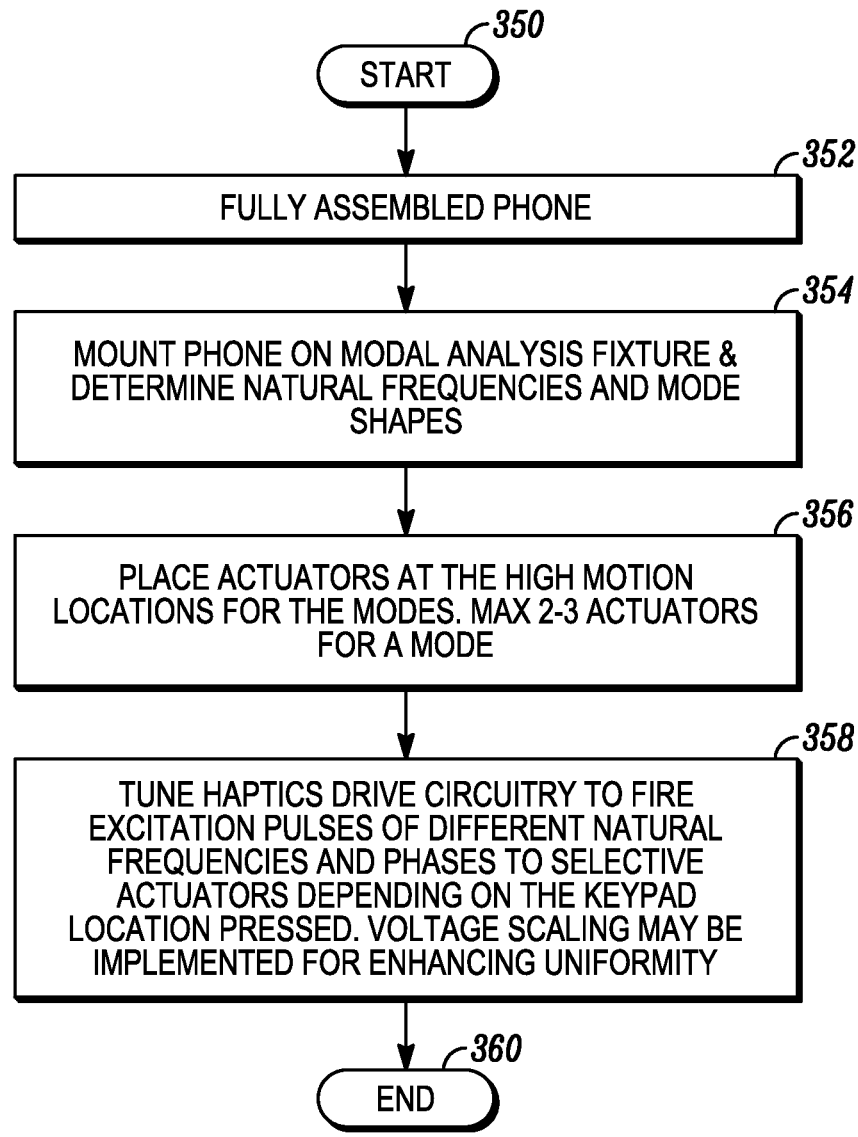
FIG. 3 is a flowchart illustrating an embodiment of an assembly line process to tune the haptics drive circuitry.

FIG. 3 is a flowchart illustrating an embodiment of an assembly line process to tune the haptics drive circuitry. At the start 350, a fully assembled device 100 (see FIG. 1), such as a mobile communication device 352 is mounted 354 on a modal analysis fixture to determine the natural frequencies and mode shapes of the device. Actuators are placed 356 at the high motion locations for the modes. The haptics drive circuitry including at least one module 120 may be tuned 358 and the process may end 360.

Figure 4:
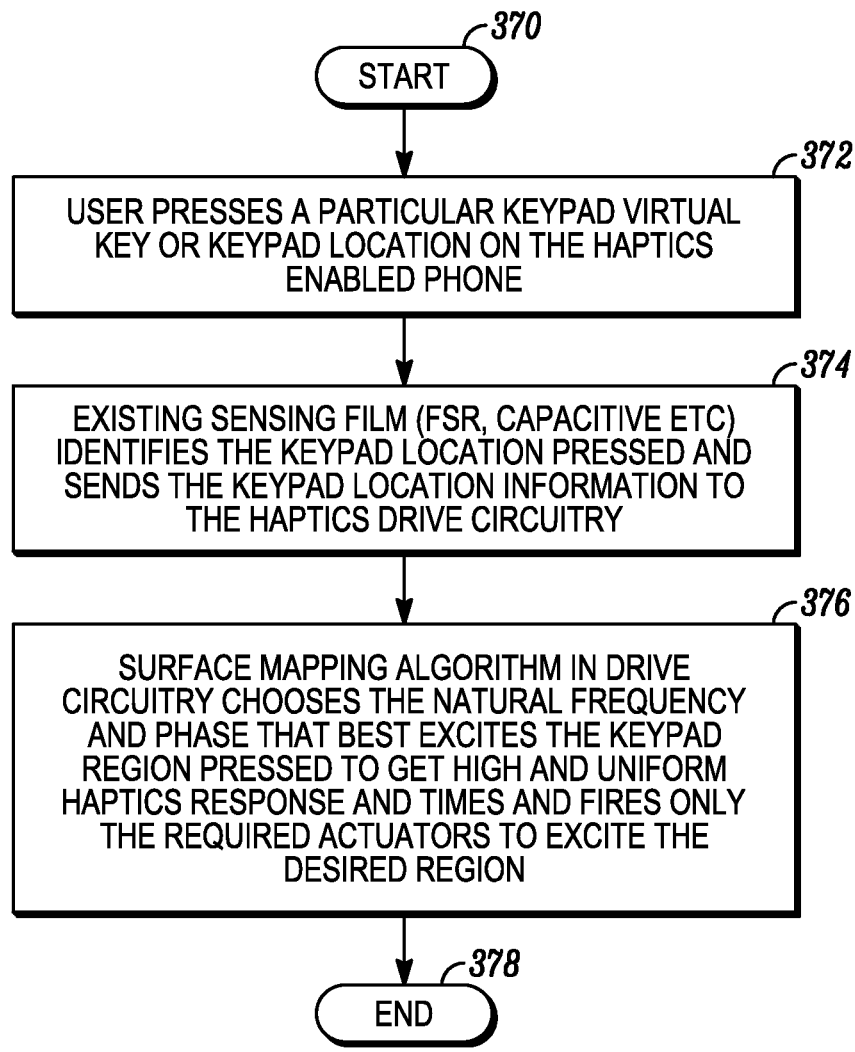
FIG. 4 is a flowchart illustrating an embodiment of a method of a touch sensitive device where at the start a user presses a particular area on the touch sensitive device.

FIG. 4 is a flowchart illustrating an embodiment of a method of a touch sensitive device 100 (see FIG. 1) where at the start 370, a user presses 372 a particular area on the touch sensitive device. The sensing film 104 identifies 374 the location pressed and sends a signal to the haptics drive circuitry. The surface mapping process of the haptic actuator drive frequency module 120 chooses the natural frequency and phase to excite the region/area touched and the process may end 378.

To increase the response still further, during product development, actuators may be optimally placed such that they are located at the high motion regions of the modes/natural frequencies they are to excite. Based on simulations and/or experimentation, actuators 106, 108, 110 and 112 (see FIG. 1) may be placed at the high movement points of the modes (and avoiding node locations) and selectively exciting them with different phased pulses which can significantly increase the mode excitation and enhance the response (amplitude) and uniformity of touch sensitive device haptics. The actuators placed at selected regions on the touch sensitive device 100 which can enhance the haptics response. In one embodiment, actuators may be placed optimally instead of covering the complete surface and therefore may reduce the battery consumption while enhancing the haptics experience. In this way, a product can be tuned so that the haptic response across the touch screen or keypad would be uniform.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitably entitled.

The invention claimed is:

1. A method comprising:
receiving touch input to a first region of a surface of a touch sensitive device;
selecting, in response to receiving the touch input to the first region, a first set of drive frequency values;
outputting one or more first drive frequency signals, at frequencies based on the first set of drive frequency values, to respective one or more first haptic actuators included in a plurality of haptic actuators coupled to the surface of the touch sensitive device, the one or more first haptic actuators being located in proximity to the first region;
receiving touch input to a second region of the touch sensitive device;
selecting, in response to receiving the touch input to the second region, a second set of drive frequency values; and
outputting one or more second drive frequency signals, at frequencies based on the second set of drive frequency values, to respective one or more second haptic actuators included in the plurality of haptic actuators coupled to the surface of the touch sensitive device, the one or more second haptic actuators being located in proximity to the second region,
wherein a first natural frequency response and a first mode shape for the touch sensitive device are associated with the first region, and are results of performing a first modal analysis of the surface of the touch sensitive device, wherein a second natural frequency response and a second mode shape for the touch sensitive device are associated with the second region, and are results of performing a second modal analysis of the surface of the touch sensitive device, wherein the first set of drive frequency values are determined based on the results of the first modal analysis, and are computationally derived in order to provide a substantially same haptic response at the first region and at the second region, and wherein the second set of drive frequency values are determined based on the results of the second modal analysis, and are computationally derived in order to provide a substantially same haptic response at the first region and at the second region.

2. The method of claim 1,
wherein outputting the one or more first drive frequency signals includes driving respective one or more haptic actuators included in the plurality of haptic actuators of the touch sensitive device at a respective first drive frequency; and wherein outputting the one or more second drive frequency signals includes driving respective one or more haptic actuators included in the plurality of haptic actuators of the touch sensitive device at a respective second drive frequency.

3. The method of claim 1, wherein the first set of drive frequency values and the second set of drive frequency values are included in a standardized set of drive frequency values, and wherein the method further comprises:
storing the standardized set of drive frequency values.

4. The method of claim 1, wherein the plurality of haptic actuators are coupled to the surface of the touch sensitive device at optimally determined locations that are associated with high motion regions.

5. The method of claim 4, wherein the first region is identified as a high motion region, and based on the first region being identified as a high motion region, the one or more first haptic actuators are coupled to the surface of the touch sensitive device at respective optimally determined locations associated with the first region.

6. The method of claim 5, wherein the second region is identified as a high motion region, and based on the second region being identified as a high motion region, the one or more second haptic actuators are coupled to the surface of the touch sensitive device at respective optimally determined locations associated with the second region.
storing the standardized set of drive frequency values.

7. A touch sensitive device, comprising:
a controller;
a memory in communication with the controller;
a touch sensitive layer having a plurality of regions including a first region, the touch sensitive layer in communication with the controller, the memory including a set of drive frequency values associated with the first region, the set of drive frequency values being determined based on results of performing a modal analysis of the touch sensitive layer and being computationally derived in order to provide a substantially same haptic response at the first region and at each of the plurality of regions, the modal analysis associating a natural frequency response and a mode shape for the touch sensitive layer with the first region;

a plurality of haptic actuators proximal the touch sensitive layer and in communication with the controller, one or more of the plurality of haptic actuators being located in proximity to the first region; and a haptic actuator drive frequency module stored by the memory and in communication with the controller, the haptic actuator drive frequency module configured to:
receive touch input from the first region of the touch sensitive layer;
select, in response to receiving the touch input from the first region, the set of drive frequency values; and
output one or more drive frequency signals, at frequencies based on the set of drive frequency values, to respective of the one or more of the plurality of haptic actuators located in proximity to the first region.

8. The device of claim 7, wherein based on the output of the haptic actuator drive frequency module, the controller is configured to deliver a haptic actuator drive frequency signal to a respective one or more of the plurality of haptic actuators located in proximity to the first region.

9. The device of claim 7, wherein the touch sensitive layer is resistive or capacitive.

10. The device of claim 7, wherein the plurality of haptic actuators are piezo electric elements.

11. The device of claim 7, wherein the touch sensitive device is a keypad.

12. The device of claim 7, wherein the touch sensitive device is a touch screen.

13. A touch sensitive device comprising:
a controller
a memory in communication with the controller;
a touch sensitive layer having a plurality of regions including a first region and a second region,
the touch sensitive layer in communication with the controller,
the memory including a first set of drive frequency values associated with the first region and a second set of drive frequency values associated with the second region,
the first set of drive frequency values being determined based on results of performing a modal analysis of the touch sensitive layer and being computationally derived in order to provide a substantially same haptic response at the first region and at the second region, the modal analysis associating a first natural frequency response and a first mode shape for the touch sensitive layer with the first region, and
the second set of drive frequency values being determined based on results of performing a modal analysis of the touch sensitive layer and being computationally derived in order to provide a substantially same haptic response at the second region and the first region, the modal analysis associating a second natural frequency response and a second mode shape for the touch sensitive layer with the first region;

a plurality of haptic actuators proximal the touch sensitive layer and in communication with the controller, one or more first haptic actuators included in the plurality of haptic actuators being located in proximity to the first region, and one or more second haptic actuators included in the plurality of haptic actuators being located in proximity to the second region; and a haptic actuator drive frequency module stored by the memory and in communication with the controller, the haptic actuator drive frequency module being configured:

to receive first touch input to the first region of the touch sensitive layer;
to select the first set of drive frequency values;
to output one or more first drive frequency signals at a frequencies based on the first set of drive frequency values, the one or more first drive frequency signals to be delivered via the controller to respective one or more of the first haptic actuators;
to receive second touch input to the second region of the touch sensitive layer;
to select the second set of drive frequency values; and
to output one or more second drive frequency signals at a frequencies based on the second set of drive frequency values, the one or more second drive frequency signals to be delivered via the controller to respective one or more of the second haptic actuators, the one or more first drive frequency signals and the one or more second drive frequency signals providing substantially a same haptic response at the first region and at the second region of the touch sensitive device.

14. The device of claim 13, further comprising:
circuitry to drive a respective one or more of the plurality of haptic actuators of the touch sensitive device at a respective first drive frequency based on a respective first drive frequency signal; and
circuitry to drive a respective one or more of the plurality of haptic actuators of the touch sensitive device at a respective second drive frequency based on a respective second drive frequency signal.

15. The device of claim 13, wherein the touch sensitive layer is resistive or capacitive.

16. The device of claim 13, wherein the plurality of haptic actuators are piezo electric elements.

17. The device of claim 13, wherein the touch sensitive device is a keypad.

18. The device of claim 13, wherein the touch sensitive device is a touch screen.

19. A method for tuning a touch sensitive device comprising:
performing a first modal analysis of a surface of the touch sensitive device;
determining a first natural frequency response and a first mode shape of a first region of the touch sensitive device based on the first modal analysis;
performing a second modal analysis of the surface of the touch sensitive device;
determining a second natural frequency response and a second mode shape of a second region of the touch sensitive device based on the second modal analysis;
generating a first set of drive frequency values for one or more first actuators included in a plurality of actuators coupled to the surface of the touch sensitive device based on the determined first natural frequency response and the first mode shape of the first region;
generating a second set of drive frequency values for one or more second actuators included in the plurality of actuators coupled to the surface of the touch sensitive device based on the determined second natural frequency response and the second mode shape of the second region; and
creating a surface map for the surface of the touch sensitive device,
the surface map associating the first set of drive frequency values for the one or more first actuators with the first region and associating the second set of drive frequency values for the one or more second actuators with the second region,
the generated first set of drive frequency values providing a first haptic response at the first region when touch input is received at the first region, and
the generated second set of drive frequency values providing a second haptic response at the second region when touch input is received at the second region, the first haptic response being substantially the same as the second haptic response.

* * * * *

UNITED STATES PATENT AND TRADEMARK OFFICE
CERTIFICATE OF CORRECTION

| | | |
|---|---|---|
| PATENT NO. | : 9,164,584 B2 | Page 1 of 1 |
| APPLICATION NO. | : 12/427197 | |
| DATED | : October 20, 2015 | |
| INVENTOR(S) | : Gary K. Mui et al. | |

It is certified that error appears in the above-identified patent and that said Letters Patent is hereby corrected as shown below:

In the claims

In column 5, line 52, in claim 6, below "region." delete "storing the standardized set of drive frequency values.".

In column 6, line 31, in claim 13, delete "controller" and insert -- controller; --, therefor.

Signed and Sealed this
Twenty-third Day of February, 2016

Michelle K. Lee
*Director of the United States Patent and Trademark Office*